United States Patent [19]
Saito

[11] Patent Number: 5,161,037
[45] Date of Patent: Nov. 3, 1992

[54] IMAGE PROCESSING SYSTEM AND METHOD FOR PROCESSING DOCUMENTS IN ACCORDANCE WITH A JOB CONTROL SHEET

[75] Inventor: Hiroshi Saito, Kanagawa, Japan
[73] Assignee: Fuji Xerox Corporation, Ltd., Tokyo, Japan
[21] Appl. No.: 595,223
[22] Filed: Oct. 10, 1990
[51] Int. Cl.[5] .................... G03G 15/00; H04N 1/04
[52] U.S. Cl. .................... 358/468; 355/200; 358/434; 358/448; 358/498
[58] Field of Search ............ 358/401, 403, 405, 406, 358/443, 464, 467, 468, 470, 474, 486, 496, 497, 498, 434, 437; 382/61; 355/200, 208, 308, 321, 325, 309; 235/379, 454, 456

[56] References Cited
U.S. PATENT DOCUMENTS

| | | | |
|---|---|---|---|
| 4,190,354 | 2/1980 | Smith et al. | 355/309 |
| 4,352,012 | 9/1982 | Verderber et al. | 358/498 |
| 4,716,438 | 12/1987 | Farrell | 355/6 |
| 5,051,779 | 9/1991 | Hikawa | 355/200 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

An image processing system in which input image information that is read from a document original is sujected to image processing on the basis of machine operating instruction information that is defined by a job control sheet, to obtain output image information. Machine operating instruction information borne by the job control sheet is read and interpreted, and it is judged whether or not the interpreted instruction is executable. When the machine operating instruction is executable, image processing of a batch of document originals following the job control sheet is executed to generate output image information, whereas, if the machine operating instruction is unexecutable, the batch of document original is fed forward without being processed up to the last document original that immediately precedes a subsequent job control sheet.

6 Claims, 4 Drawing Sheets

FIG. 3

IMAGE PROCESSING SYSTEM AND METHOD FOR PROCESSING DOCUMENTS IN ACCORDANCE WITH A JOB CONTROL SHEET

The present invention relates to an image processing system that performs processing of document originals by use of control sheets (hereinafter referred to as "paper user interface") that indicate command information.

BACKGROUND OF THE INVENTION

Discussion of the Related Art

In systems or copying machines that perform processing of document originals, stacks of documents which are to be processed (hereinafter referred to as "batches") are set in a document handler or feeder and successively subjected to the desired processing operations. Since a large amount of batches can be stacked, in many cases no operators attend the system during the processing. An example of one type of such a document processing system is an image processing system that employs a paper user interface, such as the image processing system disclosed in U.S. Pat. No. 4,716,438.

Prior art image processing systems suffer from a problem described as follows. During a document processing operation, an instruction that cannot be accomplished may be given to a document processing system, for example, when blank sheets in the printer have been used up. When such an instruction that cannot be accomplished is given, the system falls into a fault condition. If the system is not released from the fault condition by the operator, all of the stacked batches must wait, resulting in a marked lowering in the productivity.

SUMMARY OF THE INVENTION

The present invention has been made in view of the above circumstances and has as an object to provide an image processing system that executes various kinds of processing instructions using a paper user interface, the system being designed so that the productivity will not be lowered even if an unexecutable processing instruction is requested.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the present invention provides an image processing system wherein input image information that is read from a document original is subjected to image processing according to machine operating instruction information defined by a job control sheet, to generate output image information, the system comprising: means for reading and interpreting machine operating instruction information borne by the job control sheet; means for judging whether or not the interpreted machine operating instruction information is executable; means for executing, when the machine operating instruction is executable, image processing of a batch of document originals following the job control sheet to generate output image information; and means for feeding forward, when the machine operating instruction is unexecutable, the batch of document originals up to a last document original that immediately precedes a subsequent job control sheet without subjecting the batch of document originals to image processing.

The machine operating instruction information that is defined by the job control sheet is either processing control information for a batch of document originals following the sheet or control program information for the image processing system, the job control sheet for each of successive batches of document originals serving to segregate the successive batches of document originals.

The image processing system may further comprise means for informing an operator whether or not there is a batch of document originals which has been fed forward without being processed.

A plurality of batches each comprising a job control sheet and a stack of document originals are stacked up in an automatic document feeder and successively subjected to image processing. With regard to each batch, machine operating instruction information that is defined by the job control sheet is read and a judgment is made as to whether or not the batch is executable from the read information. Executable batches are successively processed, but when an unexecutable batch appears, the job control sheet and document originals of this batch are fed forward without being processed up to the document original that immediately precedes a subsequent job control sheet. Since executable batches are preferentially processed, the productivity is improved.

Further in accordance with the present invention there is provided a method for subjecting to image processing input image information that is read from a document original according to machine operating instruction information defined by a job control sheet. The method comprises the steps of reading and interpreting machine operating mechanism information borne by the job control sheet; judging whether or not the interpreted operating instruction information is executable; executing, when the machine operating instruction is executable, image processing of a batch of document originals following the job control sheet to generate output image information; and feeding forward, when the machine operating instruction is unexecutable, the batch of document originals up to a last document original that immediately precedes a subsequent job control sheet without subjecting the batch of document originals to image processing.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings:

FIG. 3 shows one example of a job control sheet; and

DETAILED DESCRIPTION OF THE PREFERRED EMBODIMENT

An embodiment of the present invention will be described below in detail with reference to the accompanying drawings.

Figure 1:
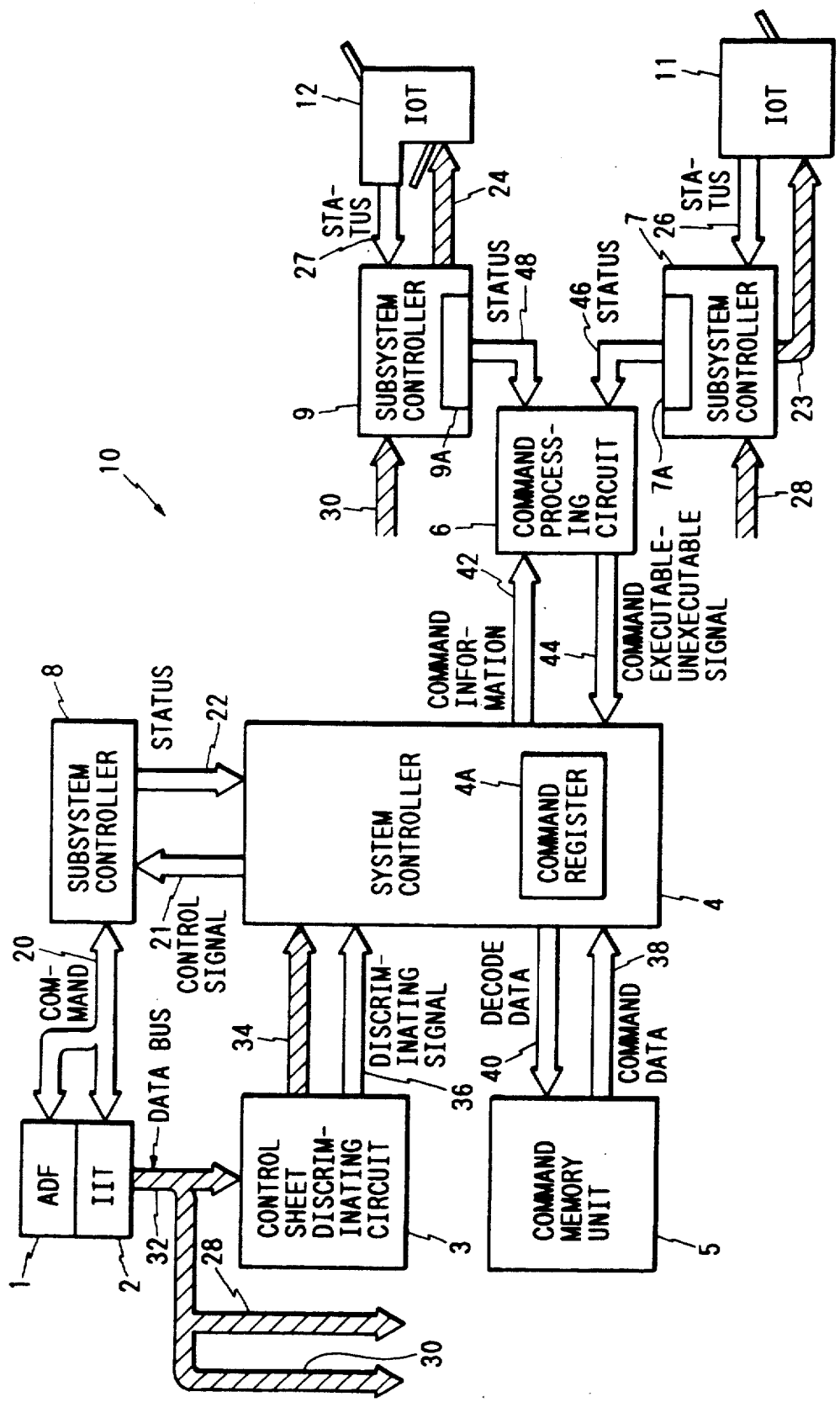
FIG. 1 is a control block diagram of an embodiment of an image processing system using a paper user interface according to the present invention.

Referring first to FIG. 1, which is a control block diagram of an image processing system 10 that uses a paper user interface, the image processing system 10 comprises an automatic document feeder (ADF) 1 into which is placed a stack of document originals on top of which is set a job control sheet as a front cover of the stack. The image processing system 10 also comprises an image input terminal (IIT) 2 that reads the job control sheet and the document originals by image scanning, image output terminals (IOTs) 11 and 12 that are respectively, for example, a printer and a facsimile machine, and a system controller 4 and subsystem controllers 7, 8 and 9 that control the above-described devices.

Subsystem controller 8 is coupled to the ADF 1 and the IIT 2 by a control bus 20. Subsystem controller 8 is also coupled to system controller 4 by a control bus 21 and a status bus 22. Subsystem controllers 7 and 9 are respectively coupled to IOTs 11 and 12 by image data and control buses 23 and 24 for providing image data and control signals to the IOTs. IOTs 11 and 12 are further respectively coupled to subsystem controllers 7 and 9 by status buses 26 and 27 on which IOT status information is provided to the associated subsystem controller. The subsystem controllers 7 and 9 respectively include status registers 7A and 9A for storing information such as the operational status of IOTs 11 and 12. The subsystem controllers 7 and 9 are further coupled to the IIT 2 via data bus portions 28 and 30, which are connected to an image output data bus 32, to receive image data that is scanned from document originals.

The image processing system 10 also includes a control sheet discriminating circuit 3 coupled to the IIT 2 via the data bus 32 to receive scanned image data and to determine whether the document corresponding to the scanned image data is a job control sheet or a document original. The control sheet discriminating circuit 3 is coupled via a data bus 34 and a discriminating signal bus 36 to system controller 4.

The image processing system 10 further includes a command memory unit 5 that comprises a ROM and a hard disk for storing command information for controlling the operation of the image processing system 10. The command memory unit 5 is coupled to the system controller 4 by command bus 38 for transmitting command information to the system controller 4 and by a control bus 40 for receiving signals for controlling access by the system controller 4 to a desired memory location in the command memory unit 5. The system controller 4 includes a command register 4A for storing commands retrieved from the command memory unit 5.

The image processing system 10 additionally includes a command processing circuit 6 that is coupled to the system controller 4 via a command bus 42 and a control bus 44. The command processing circuit 6 is further coupled by status buses 46 and 48 to the status registers 7A and 9A to read operational status information therefrom.

Figure 3:
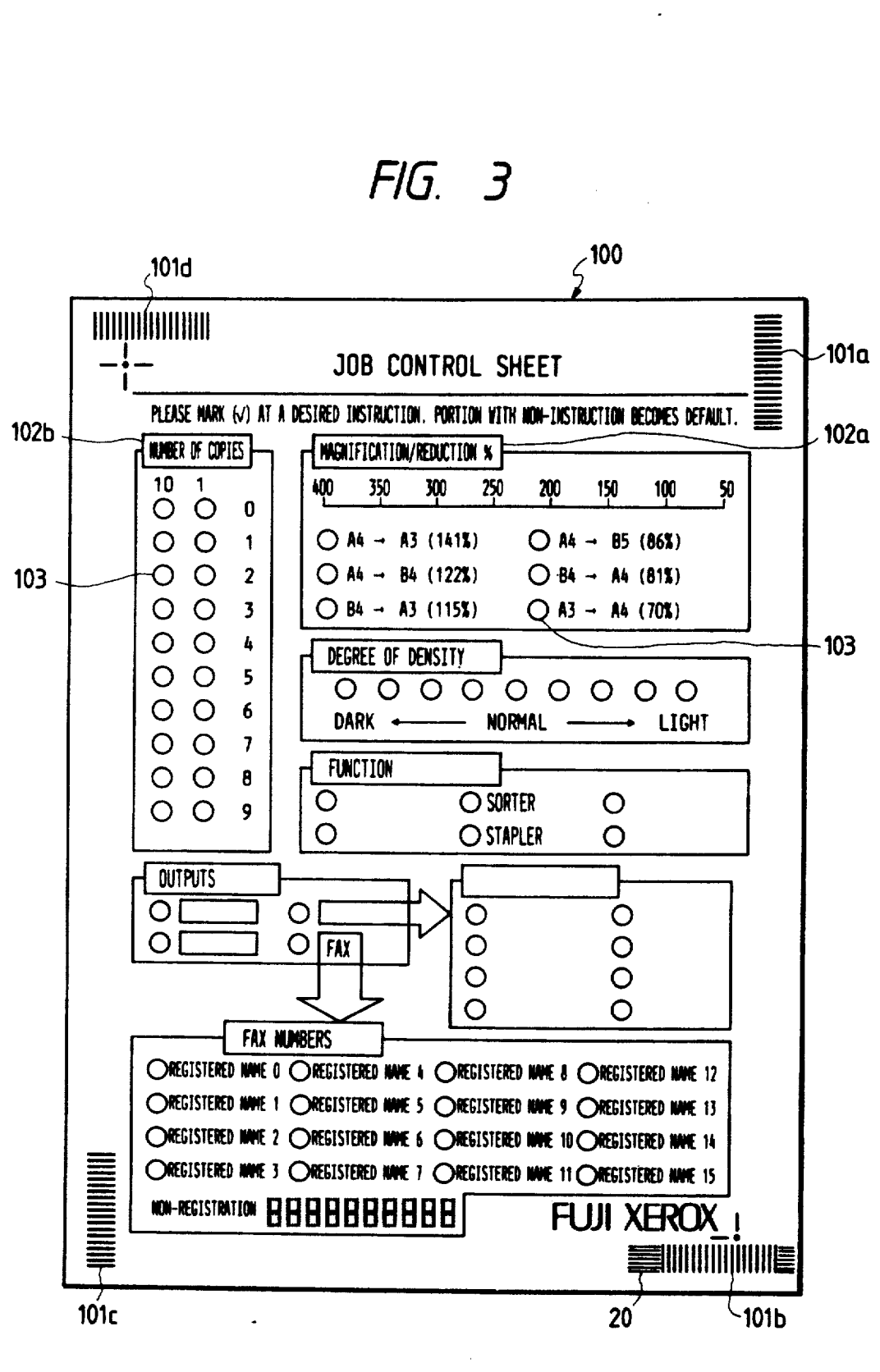

Referring to FIG. 3, an exemplary job control sheet 100 has sheet detecting marks 101a, 101b, 101c and 101d, in the form of, for example, bar codes, which are disposed on the four corners thereof. Within the area that is defined by the marks 101a to 101d are provided job control designating sections 102a, 102b, . . . for defining attributes of a job as machine operating instruction information. The sheet detecting marks 101a to 101d are used to enable the image processing system 10 to distinguish the sheet 100 from document originals, which have no sheet detecting marks. The substantive information encoded into the marks 101a to 101d is related to the direction of the document originals and is also used to give instructions for batch processing. For example, the bar codes are recorded such that start bit data, stop bit data and checksum data are successively disposed within the bar code. The read position is regulated by a plurality of lines adjacent to the bar code in the main scanning direction e.g., lines 20 adjacent to the bar code of detecting marks 101a. In order to prevent an erroneous detection, the widths of bars that constitute a bar code are detected at each line of the plurality of lines and the detected widths are averaged. Such use of bar codes and their detection is described in greater detail in commonly assigned, copending U.S. patent application Ser. No. 07/595,213 which is hereby incorporated by reference.

The attributes of a job, that is, the requirements for performing a job are designated by a user in designating areas of the job control sheet 100. Such designating areas include, e.g., a paper size designating area 102a, a number of copies to be made designating area 102b, etc. The job requirements are entered by a user in check areas 103 in the form of visible and decipherable information. For example, a user would simply darken with a pencil on appropriate check area 103 in paper size designating area 102a to record a desired magnification or reduction. It should be noted here that the attributes of a job serve as machine operating instruction information for executing image processing of input image information read from the associated document originals in order to generate output image information, and then to output the output image information from an output unit of image processing system 10.

The operation of image processing system 10 is described next. The automatic document feeder 1 is activated in response to a read job control sheet command outputted by the subsystem controller 8 on the control bus 20. Subsystem controller 8 outputs the command in response to a control signal that is output from the system controller 4 on the control bus 21. As a result, the job control sheet is fed to the image reading unit 2 where the sheet detecting marks 101a-101d and the job attributes represented by the user designated check areas 103 are read.

The control sheet discriminating circuit 3 determines from the scanned image information whether the scanned sheet is a job control sheet or a document original. If the scanned sheet is a job control sheet, the circuit 3 outputs to the system controller 4 a discriminating signal on the signal bus 36 and the job attribute information, scanned from the job control sheet, on the data bus 34. In response to the job attribute information, the system controller 4 communicates via buses 38 and 40 to fetch from the command memory unit 5 command information corresponding to the decoded job attribute information from the job control sheet 100. An address in the ROM is determined by decoding a bar code on the job control sheet 100. The ROM stores a directory on the hard disk, so that a command content, such as relating to instructions for batch processing corresponding to the address determined from the decoded bar code is read from the hard disk. Retrieved command information is input to the command register 4A.

On the basis of the command data, the command processing circuit 6 checks the status of the recording unit 11 or 12, e.g., a printer, a facsimile, etc., which is required to execute the command, by fetching, via the status buses 46 and 48, information from the status register 7A or 9A in the subsystem controller 7 or 9. Then, the command processing circuit 6 outputs on the control bus 44 information, in the form of a command executable-unexecutable signal, representative of whether or not the command is executable by the system controller 4. The system controller 4 instructs the automatic document feeder 1 and the image reading unit 2 on the basis of the received information representative of whether or not the command is executable. More specifically, when the command is executable, it is executed, so that the image information that is read from the document concerned is sent to the relevant subsystem controller 7 or 9, via data bus portion 28 or 30, to execute output processing in accordance with the job attribute information. The subsystem controller 7 or 9 forwards the image information to IOU 11 or 12, respectively, via bus 23 or 24. When the command is not executable, the system controller 4 instructs the subsystem controller 8 for the automatic document feeder 1 to feed the batch of document originals forward and executes no processing of this batch until the job control sheet 100 of a next batch is read and the next batch is judged to be executable. Also, when it is determined that the command is not executable, the system controller 4 activates a display unit (not shown) on a console panel to display the fact that there is a batch that is not processed. It should be noted that, when the subsystems of the image processing system comprise a printer and a facsimile machine, the status information of the printer, for example, are those which are displayed on the console panel of a typical conventional printer, i.e., whether or not sheets are available for printing, the paper size, the amount of remaining toner, etc.

Figure 2:
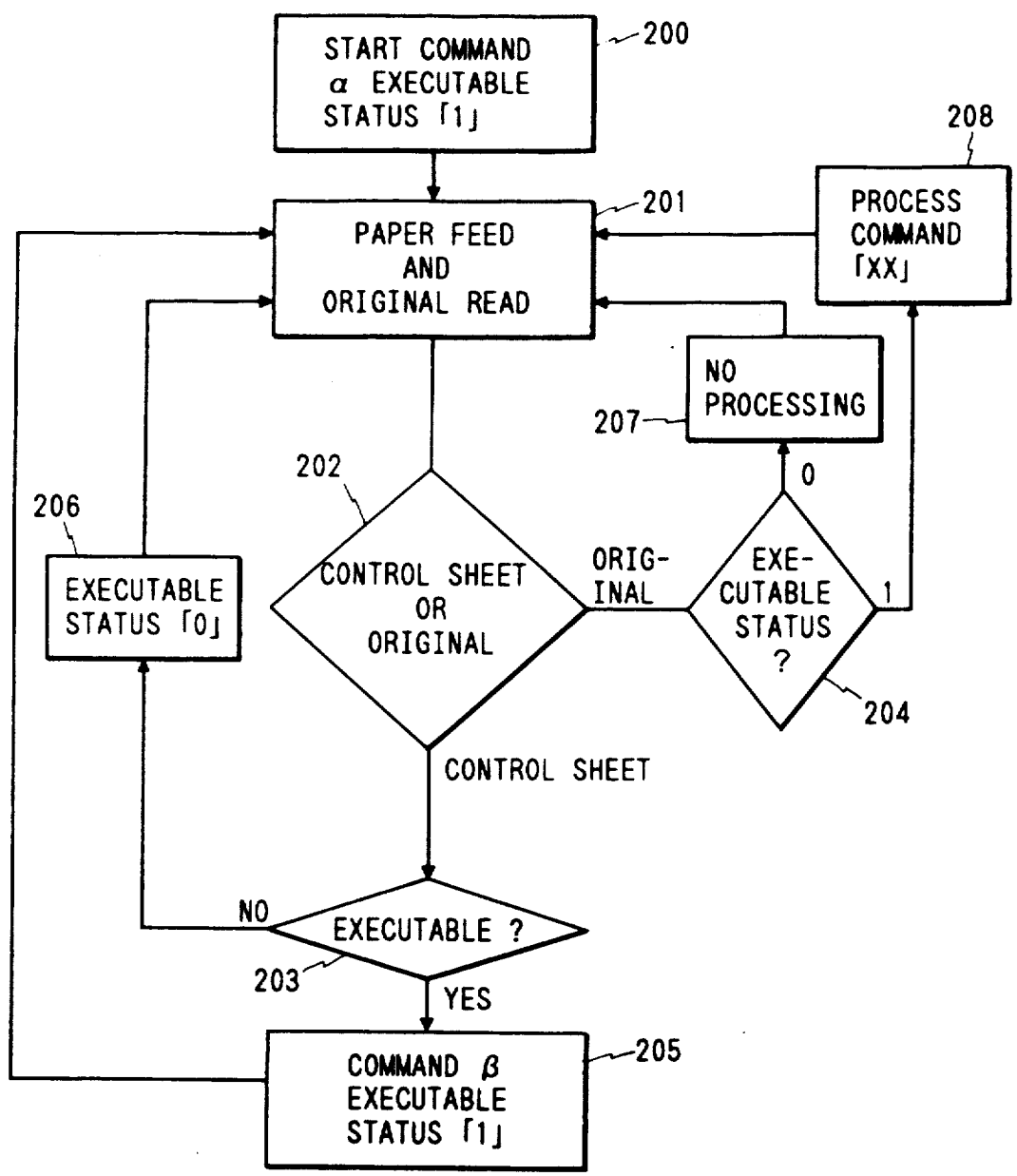
FIG. 2 is a flowchart showing a job control sheet processing routine.
Figure 4:
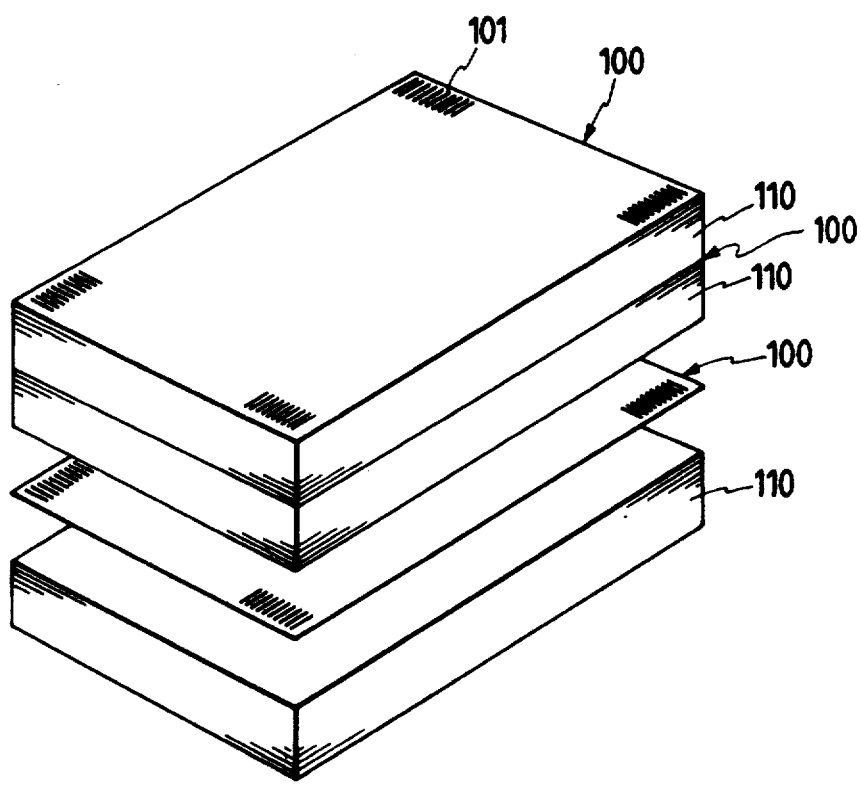
FIG. 4 shows stacks of document originals arranged for printing, each with a job control sheet, to explain a batch processing.

Although in this embodiment bar codes are employed to represent code information on the job control sheet 100, it is also possible to use character information, e.g., numerals, letters, etc or density information which may be put on predetermined positions of a job control sheet The processing of a job control sheet is explained next. FIG. 2 is a flowchart of a job control sheet processing routine. It should be noted that the following description is made by way of an example in which a plurality of batches each comprising a job control sheet 100 and a stack 110 of document originals are set in the automatic document feeder 1, as shown in FIG. 4.

First, when a command α whose executable status has been set to "1" is input, the processing routine starts (Step 200), and the automatic document feeder 1 is activated to feed a job control sheet or a document original and an image thereof is read (Step 201). Next, discrimination between a job control sheet and a document original is made on the basis of the image information read from the fed document (Step 202).

If the sheet fed in Step 201 is a job control sheet, it is judged whether or not the job instructed by the job control sheet is executable (Step 203). If the job is judged to be executable in Step 203, a command β whose executable status has been set to "1" is input (Step 205). The processing routine then returns to execute Step 201. If the job is judged to be unexecutable in Step 203, the executable status is set to "0" in Step 206, and Step 201 is then executed.

If the sheet fed in Step 201 is a document original, it is checked whether the previously set executable status for the job is "0" or "1" (Step 204). In general, for any document original in an executable job, the executable status is determined to be "1" in Step 204, a processing command XX is input (Step 208), and then Step 201 is executed.

In general, any document original in an unexecutable job is judged in Step 204 to have the executable status "0", and a no-processing command is input (Step 207). Then, Step 201 is executed.

The nature of the judgement that is made in Step 203 is explained next in greater detail As shown in FIG. 3, machine operating instruction information that is borne and defined by the job control sheet includes processing control information for a batch of document originals following the job control sheet, e.g., a number of copies to be made, a degree of density, a paper size, etc., and control program information for the image processing system, e.g., information that designates the functions of a sorter, a stapler, etc., and information that designates a facsimile to which the read image information is to be transmitted. The above-described pieces of information that are defined by the job control sheet are read, and the contents of the information are interpreted on the basis of the information entered by the user. Subsequently, a data bus, such as data bus portion 28 or 30 and buses 23 and 24, for sending to subsystem controller 7 or 9 command and image information required for the execution of the instructions designated on the job control sheet, and the particular subsystem, for example, IOT 11 or 12 and its associated subsystem controller 7 or 9 are selected. Then the status information concerning the conditions of the data path and the particular subsystem is read. With respect to Step 203, if the system is judged to be in a fault condition from the read status information, the job is decided to be unexecutable (NO), whereas, if it is judged that the system is not in a fault condition, the job is decided to be executable (YES). The terminology "fault condition" in this context refers to a condition in which, for any reason, the image processing system cannot carry out the job in accordance with the job attributes indicated on the job control sheet 100.

In the case of a facsimile job, for example, the job is recognized as a facsimile transmission by the user's designation of the check area 103 for FAX in the job control designating section entitled "OUTPUTS" on the job control sheet (FIG. 3). A sending facsimile machine as a subsystem is specified by the user from a user designated name in the job control designating section entitled "FAXNUMBERS". For example, the registered name "0" may be specified by the user. As used herein, the registered name is the identity of a prospective recipient of a facsimile transmission to be sent by the facsimile machine subsystem of image processing system 10. As a result, a data bus path to the specified facsimile machine, e.g., buses 23 and 28 or buses 24 and 30 is selected. Then, it is judged whether or not the selected data bus is open and, at the same time, the status information that indicates whether or not the destination is busy is read, together with the status information that indicates whether the power supply of the facsimile system at the destination is ON or OFF. Then, it is judged from the read status information whether or not the system is in a fault condition to decide whether or not the job is executable.

Under certain circumstances, the job may be temporarily held unexecuted, or may be temporarily stored in the memory of the facsimile.

Although in accordance with this embodiment an unexecutable batch is fed forward by the automatic document feeder so that it is not subjected to any processing, it should be noted that an unexecutable batch may be returned to the automatic document feeder. By virtue of this arrangement, a job control sheet and document originals, which are returned, may be subjected to the desired processing because the system may be released from the fault condition when the job is to be executed at the next attempt.

Although in accordance with this embodiment a user is informed, by means of a display unit, of the fact that there is an unexecutable batch, a separator sheet of paper that is printed with the fact that the batch is unexecutable may be output instead.

As an application of this embodiment, it is also possible to provide a system wherein in the event the system is judged to be in a fault condition and a batch is therefore decided to be unexecutable, the machine operating instruction information that is borne by a job control sheet and the image information of documents in the batch are saved in a memory, for example, a hard disk, and the job is executed after the system is released from the fault condition.

It is assumed herein that a stack of document originals that constitutes one batch comprises one or more document originals.

As has been described above, according to the present invention, even if a job control sheet has an input error made by an operator, the system can continue processing subsequent batches without undergoing serious difficulties. Further, even if a subsystem has an unexpected failure, any batch that is unconcerned with the failure can be processed. In addition, since an unexecutable batch is fed forward without being processed, document originals are always handled in units of batch and it is therefore not possible to lose any document originals or undesirably change the order of document originals.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system wherein input image information that is read from a document original is subjected to image processing according to machine operating instruction information defined by a job control sheet, to generate output image information, said system comprising:
   means for reading and interpreting machine operating instruction information borne by said job control sheet;
   means for judging whether or not the interpreted machine operating instruction information is executable; means for executing, when said machine operating instruction is executable, image processing of a batch of document originals following said job control sheet to generate output image information; and
   means for feeding forward, when said machine operating instruction is unexecutable, said batch of document originals up to a last document original that immediately precedes a subsequent job control sheet without subjecting said batch of document originals to image processing.

2. An image processing system according to claim 1, wherein the machine operating instruction information that is defined by said job control sheet is either processing control information for a batch of document originals following said job control sheet or control program information for said image processing system, said job control sheet for each of successive batches of document originals serving to segregate the successive batches of document originals.

3. An image processing system according to claim 1, further comprising means for informing an operator whether or not there is a batch which has been fed forward without being processed.

4. An image processing system according to claim 1 wherein said means for reading and interpreting further includes:
   image input means for scanning said job control sheet or said document original and providing scanned image date; and discriminating means, operatively coupled to said image input means, for determining whether the scanned image data corresponds to said job control sheet or said document original.

5. An image processing system according to claim 4, further including memory means for storing operating instructions for said image processing system;
   wherein said discriminating means provides job attribute information determined from the scanned image data corresponding to said job control sheet and a discriminating signal indicating that the scanned image data corresponds to said job control sheet; and
   wherein said means for reading and interpreting includes controller means, operatively coupled to said discriminating means to receive the job attribute information and said discriminating signal, for retrieving from said memory means operating instructions corresponding to the job attribute information and for controlling the operation of said image processing system in accordance with the operating instructions.

6. A method for subjecting to image processing input image information that is read from a document original according to machine operating instruction information defined by a job control sheet, said method comprising the steps of:
   reading and interpreting machine operating instruction information borne by said job control sheet;
   judging whether or not the interpreted operating instruction information is executable;
   executing, when said machine operating instruction is executable, image processing of a batch of document originals following said job control sheet to generate output image information; and
   feeding forward, when said machine operating instruction is unexecutable, said batch of document originals up to a last document original that immediately precedes a subsequent job control sheet without subjecting said batch of document originals to image processing.

* * * * *

UNITED STATES PATENT AND TRADEMARK OFFICE
CERTIFICATE OF CORRECTION

PATENT NO. : 5,161,037
DATED : November 03, 1992
INVENTOR(S) : Hiroshi Saito

It is certified that error appears in the above-indentified patent and that said Letters Patent is hereby corrected as shown below:

Claim 4, column 8, line 28, change "date" to --data--.

Signed and Sealed this

Twenty-fifth Day of January, 1994

Attest:

BRUCE LEHMAN

*Attesting Officer*     *Commissioner of Patents and Trademarks*